Patented Oct. 11, 1927.

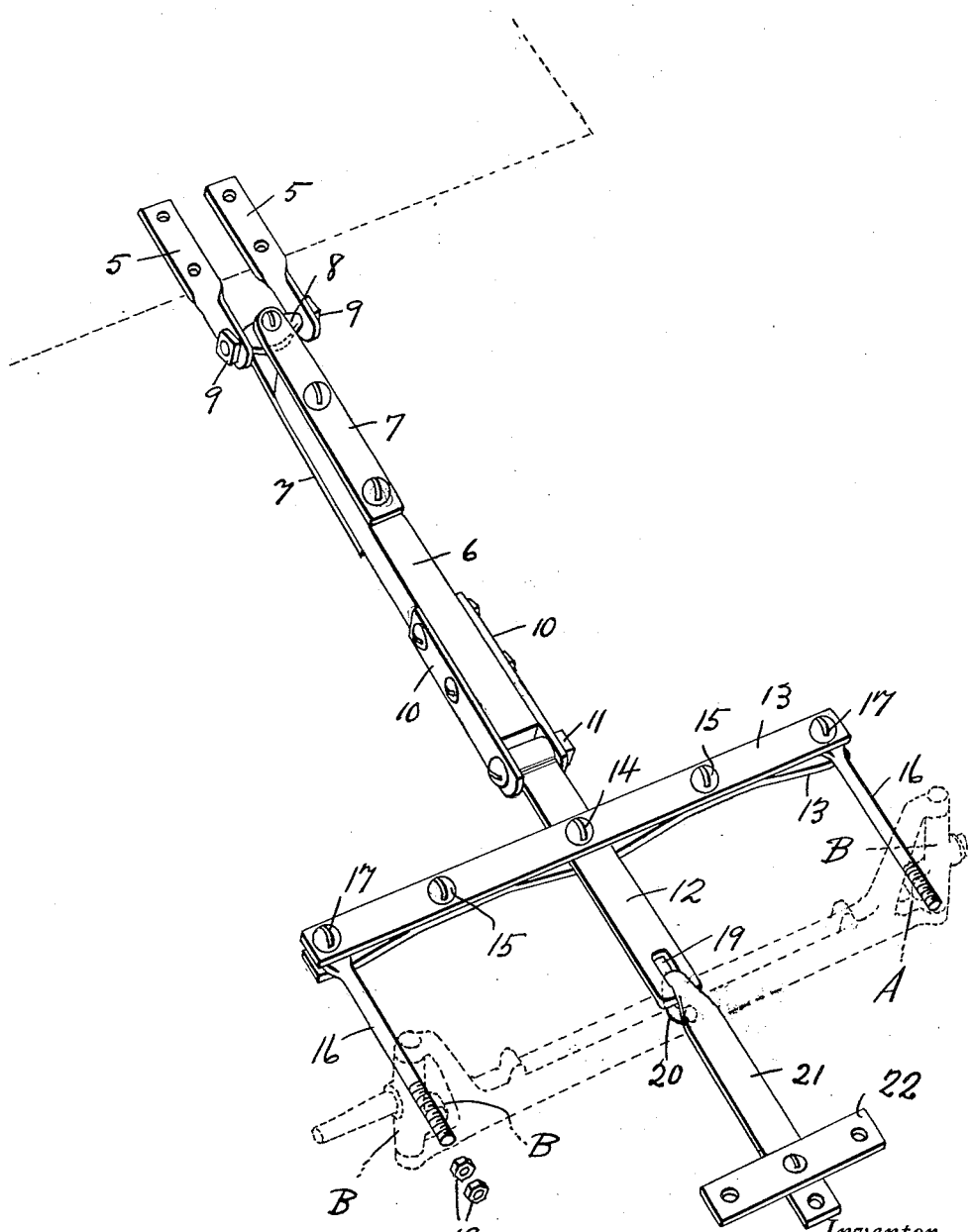

1,644,916

UNITED STATES PATENT OFFICE.

JOHN WILLIAM ESSARY, OF HAMLIN, TEXAS.

TRAILER HITCH.

Application filed October 6, 1926. Serial No. 139,872.

This invention relates to new and useful improvements in vehicle towing devices and has more particular reference to a hitch construction adapted primarily for use in the connection of a trailer to an automobile so that the steering wheel of the trailer will be moved simultaneously with the turning of the vehicle.

One of the main objects of the invention is to provide a hitch of this character that is extremely simple of construction, one that may be installed without requiring unusual labor and expenditure.

Other objects will become apparent as the nature of the invention is better understood, the same consisting of the novel form, combination and arrangement of parts hereinafter more fully described, shown in the accompanying drawing and claimed.

In the drawing:—

The figure is a perspective of the trailer hitch constructed in accordance with the present invention.

Now having particular reference to the drawing, my novel hitch constitutes the provision of a pair of bracket arms 5—5 which are constructed for rigid attachment to the rear end of the vehicle provided for pulling the trailer. The hitch constitutes further the provision of a tongue 6 preferably of rectangular shape in cross section and upon the inner ends of which is disposed at the top and bottom sides thereof a pair of straps 7—7, the inner ends of which extend beyond the adjacent end of said tongue as indicated in the figure. Pivoted between the projecting ends of said straps 7—7 is a short cross arm 8 the outer ends of which are rounded and threaded for engagement within openings at the ends of said bracket arms 5—5 after which nuts 9—9 are screwed thereon for providing a positive connection between the tongue 6 and said brackets 5 but nevertheless to permit a vertical swinging movement of the brackets with respect to the tongue and vice versa.

Disposed upon the sides of the tongue 6 at the opposite ends thereof are straps 10—10 the outer ends of which also project beyond the adjacent end of said tongue and between which is pivotally secured upon a horizontal pivot 11 a slat-like bar 12. This bar 12 is disposed in the center of a pair of right-angular slat-like bars 13—13 and is pivoted between said bars upon a vertical pivot 14 so that said slat-like bar 12 may swing horizontally between the bars 13.

Said cross bars 13—13 are interconnected at 15—15 at opposite sides of the pivotal connection 14 between said bars and the tongue-connected bar 12. The outer ends of the bars 13—13 are separated for receiving the inner eyed ends of rods 16—16 pivoted between the bars 13—13 by vertical pivots 17—17.

The outer ends of the rods 16—16 are screw-threaded for engagement through the usual sleeves A—A at the inner sides trailer pintle knuckles B—B at the opposite ends of the trailer axle C. After the engagement of said threaded ends of the rods 16 through the sleeves said rods are secured therein by reason of nuts 18—18 threaded upon the rods at opposite sides of said sleeves in an obvious manner.

The inner end of the tongue-connected bar 12 extends above the axle tree of the trailer and is provided with an opening 19 at said inner end. Arranged within this opening is the eyed end 20 of an extension 21 for said bar 12 the inner end of which is provided with a cross arm 22 the opposite ends of which are formed with openings while the extreme outer end of said bar extension 21 is also formed with an opening in order that this bar as well as the cross arm may be bolted to the under side of the trailer crank case.

It will at once be obvious that as the trailer is being towed the front wheels of the trailer will be turned so as to steer the trailer properly in the direction of movement of the vehicle doing the towing while by reason of the pivotal connection between the bracket arms 5—5 and tongue 6 as well as the pivotal connection 11 between said tongue and said bar a relative vertical movement of the towing machine and trailer will be permitted which is, of course, absolutely necessary.

Even though I have herein shown and described the invention as consisting of certain detailed structural elements it is nevertheless to be understood that some changes may be made therein without affecting the spirit and scope of the appended claim.

Having thus described my invention what I claim as new and desire to secure by Letters Patent is:

In a structure of the class described, a pair of bracket arms, a cross member located between said arms and pivotally connected thereto for rotation about a horizontal axis, a tongue, top and bottom straps connected to said tongue and extending beyond the same and connected with said cross member, side straps connected to the opposite end of the tongue, a bar pivotally connected on a horizontal axis with said side straps, additional bars extending at right angles with said first-named bar and connected at their intermediate points to the latter, and an extension carried by the first bar and provided with a cross head, and rods pivotally connected to the outer ends of the second named bars for connection to pintle knuckles.

In testimony whereof I affix my signature.

JOHN WILLIAM ESSARY.